US007796294B2

(12) United States Patent
Sakai et al.

(10) Patent No.: US 7,796,294 B2
(45) Date of Patent: Sep. 14, 2010

(54) IMAGE FORMING APPARATUS CAPABLE OF A COLOR IMAGE, AND IMAGE FORMING METHOD FOR FORMING A COLOR IMAGE

(75) Inventors: Katsuo Sakai, Yokohama (JP); Tomoko Takahashi, Yokohama (JP); Youichiroh Miyaguchi, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 1103 days.

(21) Appl. No.: 11/481,822

(22) Filed: Jul. 7, 2006

(65) Prior Publication Data

US 2007/0013924 A1 Jan. 18, 2007

(30) Foreign Application Priority Data

Jul. 11, 2005 (JP) ............................. 2005-202067

(51) Int. Cl.
*G06F 15/00* (2006.01)
*B41C 1/00* (2006.01)
*H04N 1/46* (2006.01)
*G03G 15/02* (2006.01)

(52) U.S. Cl. ....................... 358/1.9; 358/3.32; 358/501; 399/168

(58) Field of Classification Search .................. 358/1.9, 358/1.4, 1.12, 1.17, 1.18, 501, 504, 3.32, 358/296, 496, 516; 399/100, 148, 152, 168, 399/174

See application file for complete search history.

(56) References Cited

U.S. PATENT DOCUMENTS 4,933,727 A 6/1990 Mizuma et al.
5,777,576 A * 7/1998 Zur et al. ..................... 347/120
5,881,334 A * 3/1999 Maruta et al. ................. 399/18
5,955,228 A 9/1999 Sakai et al.
6,070,031 A * 5/2000 Haneda et al. .............. 399/112
6,529,693 B2 * 3/2003 Tomizawa et al. ............. 399/44
6,549,742 B1 * 4/2003 Chigono et al. ............. 399/174
6,597,884 B2 7/2003 Miyaguchi et al.
6,708,014 B2 3/2004 Miyaguchi et al.

(Continued)

FOREIGN PATENT DOCUMENTS

JP 6-118764 4/1994

(Continued)

OTHER PUBLICATIONS

U.S. Appl. No. 12/121,122, filed May 15, 2008, Kadota et al.

(Continued)

*Primary Examiner*—Madeleine A Nguyen
(74) *Attorney, Agent, or Firm*—Oblon, Spivak, McClelland, Maier & Neustadt, L.L.P.

(57) ABSTRACT

An image forming apparatus for forming a color image, including a charging device configured to charge a moving image bearing member; a writing device configured to form a latent image the image bearing member by exposing a plurality of colors according to image information; and a developing device configured to develop the latent image with toner, wherein the writing device and the developing device are configured to perform exposure and development more than once to the image bearing member, which is charged once by the charging device so that the color image is formed from superimposed toner of each of the plurality of colors on the image bearing member.

14 Claims, 13 Drawing Sheets

U.S. PATENT DOCUMENTS

| | | | | |
|---|---|---|---|---|
| 6,721,534 | B2 | 4/2004 | Takahashi | |
| 6,901,231 | B1 | 5/2005 | Sakai et al. | |
| 6,941,098 | B2 | 9/2005 | Miyaguchi et al. | |
| 6,947,691 | B2 | 9/2005 | Miyaguchi et al. | |
| 7,024,142 | B2 | 4/2006 | Sakai et al. | |
| 7,062,204 | B2 | 6/2006 | Miyaguchi et al. | |
| 7,526,238 | B2 * | 4/2009 | Yamada et al. | 399/279 |
| 7,551,879 | B2 * | 6/2009 | Kosuge | 399/176 |
| 2004/0141766 | A1 * | 7/2004 | Toyama | 399/50 |
| 2004/0240907 | A1 | 12/2004 | Miyaguchi et al. | |
| 2004/0248025 | A1 * | 12/2004 | Miyakawa | 430/107.1 |
| 2005/0025525 | A1 | 2/2005 | Horike et al. | |
| 2005/0158073 | A1 | 7/2005 | Nakazato et al. | |
| 2005/0169660 | A1 * | 8/2005 | Yamada et al. | 399/92 |
| 2005/0185989 | A1 * | 8/2005 | Kosuge et al. | 399/168 |
| 2005/0286916 | A1 * | 12/2005 | Nakazato et al. | 399/16 |
| 2006/0018691 | A1 * | 1/2006 | Baek et al. | 399/358 |
| 2006/0227359 | A1 * | 10/2006 | Ream et al. | 358/1.14 |
| 2006/0275680 | A1 * | 12/2006 | Miyakawa | 430/45 |
| 2007/0127950 | A1 * | 6/2007 | Gila et al. | 399/176 |
| 2007/0196123 | A1 * | 8/2007 | Mizuishi et al. | 399/100 |
| 2008/0232851 | A1 * | 9/2008 | Park et al. | 399/159 |

FOREIGN PATENT DOCUMENTS

| | | |
|---|---|---|
| JP | 6-324548 | 11/1994 |
| JP | 2001-296714 | 10/2001 |
| JP | 2003-202752 | 7/2003 |

OTHER PUBLICATIONS

U.S. Appl. No. 12/140,032, filed Jun. 16, 2008, Ishii et al.
U.S. Appl. No. 12/170,930, filed Jul. 10, 2008, Takahashi et al.
U.S. Appl. No. 12/261,302, filed Oct. 30, 2008, Kosugi et al.
U.S. Appl. No. 12/176,054, filed Jul. 18, 2008, Kadota et al.

* cited by examiner

IMAGE FORMING APPARATUS CAPABLE OF A COLOR IMAGE, AND IMAGE FORMING METHOD FOR FORMING A COLOR IMAGE

CROSS-REFERENCE TO RELATED APPLICATIONS

The present application is based on and claims priority to Japanese Patent Application No. 2005-202,067 filed Jul. 11, 2005, the entire contents of which are incorporated herein by reference.

BACKGROUND OF THE INVENTION

1. Field of the Invention

This invention relates in general to an image forming apparatus configured to form a full-color image by superimposed colors with a one-time charge of an image bearing member.

2. Discussion of the Background

An image forming apparatus, such as a printer, a facsimile machine, a copy machine, a plotter, or a printer/facsimile/copy complex machine, is known to form an image according to the following electrophotographic process: charging an image bearing member (also referred to herein as a "photo conductor"), forming an electrostatic latent image, developing the image by providing adherence of powder (also referred to herein as "toner particles"), to create a toner image, and transferring the toner image to other medium.

Currently in an image forming apparatus using the above electrophotographic process, there are two different processes in a full-color image forming apparatus that superimposes color on color. One type is to rotate one image bearing member four times. During each rotation, a process of uniform electrostatic charge, a process of exposing the image, a process of forming an image by development with any one of color toners (Cyan, Magenta, Yellow, Black), and a process of transferring the developed image to an intermediate transfer member or recording medium so as to fit position each other, are performed. In the other type of process, four photo conductors are laterally arranged. For each photo conductor, the process of uniform electrostatic charge, the process of exposure image, the process of forming an image by development with any one of color toners (Cyan, Magenta, Yellow, Black), and the process of transferring the developed image on each photo conductor to an intermediate transfer member or a recording medium so as to fit position each other is performed.

However, the one photo conductor/four rotations type process has a problem of slow printing speed. And forming an image with the laterally arranged four photo conductor type process (tandem type process) has disadvantages of larger and complicated structure, and higher cost.

Consequently, another type of process has been designed. This type is capable of superimposing color toner on other color toner during one-rotation of one photo conductor (hereinafter referred to as a "one-photo-conductor/one-rotation-superimpose-type process"). And, although, there is a method of superimposing different color toner on a surface of the photo conductor by one-photo-conductor/four-rotations-type process also, this type of process has a problem of a slow printing rate. To distinguish herein the type of rotating one photo conductor four times and transferring every single color toner image per one-rotation, and the type of superimposing multiple color toners on the photo conductor without transferring every single toner image, the former is referred to as one-photo-conductor/four-rotations/transfer-type process and the latter is referred to as one-conductor/four-rotations/superimpose-type process.

In the above one-photo-conductor/one-rotation-superimpose-type process, by way of example, four sets of devices are arranged on the side of a belt-shaped or drum-shaped photo conductor. Each set forms a toner image on the photo conductor respectively, Cyan, Magenta, Yellow, or Black. This set has two uniformly charging devices (charging apparatuses) that are a corona charging device, image exposing device (exposing apparatus), and an image developing device (developing apparatus). Unlike in the case of one-photo conductor/four-rotations type process or laterally arranged four photoconductors type process, without transferring the image formed on a photo conductor previously to the recording medium or the intermediate transfer member image forming processes, that is uniformly charging, exposing, and developing, are performed for the image kept on the photo conductor, and then the image of four superimposed colors is formed at the identical position on the photo conductor. Although the two charging devices do not always have to be set up, one of them is used as a neutralization device for removing toner electric potential that has an influence on forming a latent image.

In the above apparatus, ozone natured harmful is generated from the ten corona charging devices combined in the above set of two charging devices, a charging device for the pre-transfer step, and a charging device for the transfer step. So, airflow by fan is provided to force the ozone into a filter that absorbs it.

Heretofore various approaches have been suggested concerning the above image processing apparatus by the one-photo-conductor/one-rotation-superimpose-type process. However, each suggested apparatus includes one charging device or two charging devices per color, as discussed previously. Moreover, a non-contact type charging device, for example corotron or scorotron type corona discharging device, is used so as to avoid disturbing the image formed on the photo conductor before by contacting of the charging device.

In the field of conventional image forming apparatuses, the following documents are known. Japanese Laid Open Publication No. 2003-202752 discloses a developing device that transports toner with a phase-shift electric field for developing, and Japanese Patent No. 3385008 discloses an example of a charging device that charges with a scorotron charging device.

In addition, an image forming apparatus that forms mono-color images by using two different colors individually, but forms full-color images formed superimposing color on color, is known. The apparatus performs the following steps: charging uniformly one time; forming a latent image with three different potential levels by exposing images; developing the intermediate potential pixel as a blank portion, the high potential pixel in normal development method using black toner, for example, and the low potential pixel in reverse development using red toner, for example.

Further, the devices disclosed in Japanese Patent No. 3073126 and Japanese Patent No. 3170901 are known as an image forming apparatus for forming a mono color image using three or four colors individually by more than once exposing the image. And the type of these apparatuses is called one-photo-conductor/one-rotation multi-color type process image forming apparatuses.

Moreover, it is known that a corona charging device, which is used in the one-photo-conductor/one-rotation-superimpose-type process, for example, generates much unnecessary ozone natured harmful with required corona ion. Therefore conventional image forming apparatuses are required to be equipped with a filter for removing ozone. As a result, the control of airflow, using a fan, for example, is also necessary. Consequently, a larger size and a high production cost of the apparatus is a drawback. And there is another problem that is the requirement of maintenance since a user or a maintenance person needs to replace the filter at the end of its lifetime.

On the other hand, contact type charging devices are known for generating little ozone and thus have no need for the control of airflow in the apparatus by fan, for example. However, using contact type charging devices as a device applied to one-photo-conductor/one-rotation-superimpose-type process causes disturbance of the image formed on the conductor previously. Therefore, contact type charging devices can not be in use practically.

As discussed previously, in an image forming apparatus using the one-photo-conductor/one-rotation-superimpose-type process, quantities of the toner developed on the conductor previously are supposed to vary since the photo conductor is charged uniformly from one to three times for forming a latent image of the next color. So a pre-transfer charge is required so as to get quantities of each color toner lined up after forming a full color image using four color toners before transfer. And again, the use of a non-contact type discharging device is required so as to prevent disturbance of the formed image on the conductor. In this regard, the apparatus requires more space and cost, and frequent exchange of the ozone filter because of its lifetime is shortened by the pre-transfer charging with the non-contact type discharging device.

In addition, in a case that the pre-transfer charge is performed as described, allowing that the quantities of toner can be recovered in average amount, it is impossible to reproduce with accuracy including the distribution. Ordinary, the quantities of electrostatic charge is adjusted optimally including the distribution, not only for developing, but also for transferring, so it would be the best to transfer while keeping the original quantities of electrostatic charge including the distribution. However, it is impossible to recover the original quantities. Therefore a problem of losing image quality occurs also.

In the one-photo-conductor/one-rotation/multi-color-type process described above, an apparatus forms toner image on a photo conductor with multiple color toners by exposing and developing repeatedly after charging uniformly once. After that, the apparatus transfers the image onto the recording medium all at once. This process is a method that form images of mono color in different locations depending on each color. In other words, the process cannot superimpose an image made of mono color toner on other image made of other colors in the same location. Originally, the problems to be solved and technical difficulties in the one-conductor/one-rotation-multi-color-type process differs entirely from those in the one-photo-conductor/one-rotation-superimpose-type process. Therefore, the technique of the multi-color type process can not be applied to the technique of the superimpose-type process.

SUMMARY OF THE INVENTION

Accordingly to the foregoing description, an object of the present invention is to provide an image forming apparatus and a method to form full-color images using the one-photo-conductor/one-rotation/one-charge-superimpose-type process, which has the following advantages: easy construction, lower cost, and easy maintenance.

According to the objects mentioned above, the present invention provides an image forming apparatus comprising a charging device configured to charge a moving image bearing member, a writing device configured to form a latent image in a lower course of said charging device by exposing a plurality of colors according to image information, and a developing device configured to develop the latent image with toner. Exposure and development is performed more than once by the writing device and the developing device to the image bearing member, which is charged once by the charging device so that the color image is formed from superimposed toner of each of the plurality of colors on the image bearing member.

Preferably, toner is not trapped by carriers. In addition, preferably, a device to develop by making toner hopping with a phase-shifting electric field EH developing device is used as the developing device. Furthermore, preferably, the charging device to charge the image bearing member is a contact-type developing device, and the contact-type developing device is a charge injection type developing device.

Further, it is possible to expose an image portion forming pixel supposed to be adhered with toner at a next development so as to decrease an electric potential of the image portion forming pixel in absolute value to a lower level than an electric potential of a blank portion forming pixel that is not exposed. In this case, preferably, the exposing device is configured to expose to a blank portion forming pixel that has a higher electric potential in absolute value than another blank portion forming pixel of blank portion pixels that are formed in a second or later exposure at a same time as exposure to image portion is performed, so that an electric portion of the blank portion forming pixel becomes a same level as the electric potential of the another blank portion. Or preferably, the exposing device is configured to expose to a blank portion forming pixel that has a higher electric potential in absolute value than another blank portion forming pixel of blank portion pixels that are formed in the second or later exposure before of after exposure to the image portion is performed so that the electric portion of the blank portion forming pixel becomes a same level as the electric potential of the other blank portion.

In addition, it is possible to expose a blank portion forming pixel supposed not to be adhered with toner at a next development so as to decrease an electric potential of the image portion forming pixel in absolute value to a lower level than an electric potential of the blank portion forming pixel that is not exposed. In this case, preferably the exposing device is configured to expose a blank portion forming pixel supposed not to be adhered with toner at a next development so as to decrease an electric potential of the image portion forming pixel in absolute value to a lower level than an electric potential of the blank portion forming pixel that is not exposed. Or preferably, the exposing device is configured to expose to an image portion forming pixel that has a higher electric potential in absolute value than another image portion forming pixel of image portion pixels that are formed in a second or later exposure before or after exposure to the blank portion is performed, so that electric portion of the image portion forming pixel becomes a same level as the electric potential of the another image portion.

Furthermore, preferably the charging device is configured to charge in order that the electric potential becomes more than a maximum electric potential of the layer of toner that is developed on the image bearing member.

BRIEF DESCRIPTION OF THE DRAWINGS

While the specification concludes with claims particularly pointing out and distinctly claiming the subject matter which is regarded as the invention, the objects and features of the invention and further objects, features and advantages thereof will be better understood from the following description taken in connection with the accompanying drawings in which:

DESCRIPTION OF THE PREFERRED EMBODIMENTS

Figure 1:
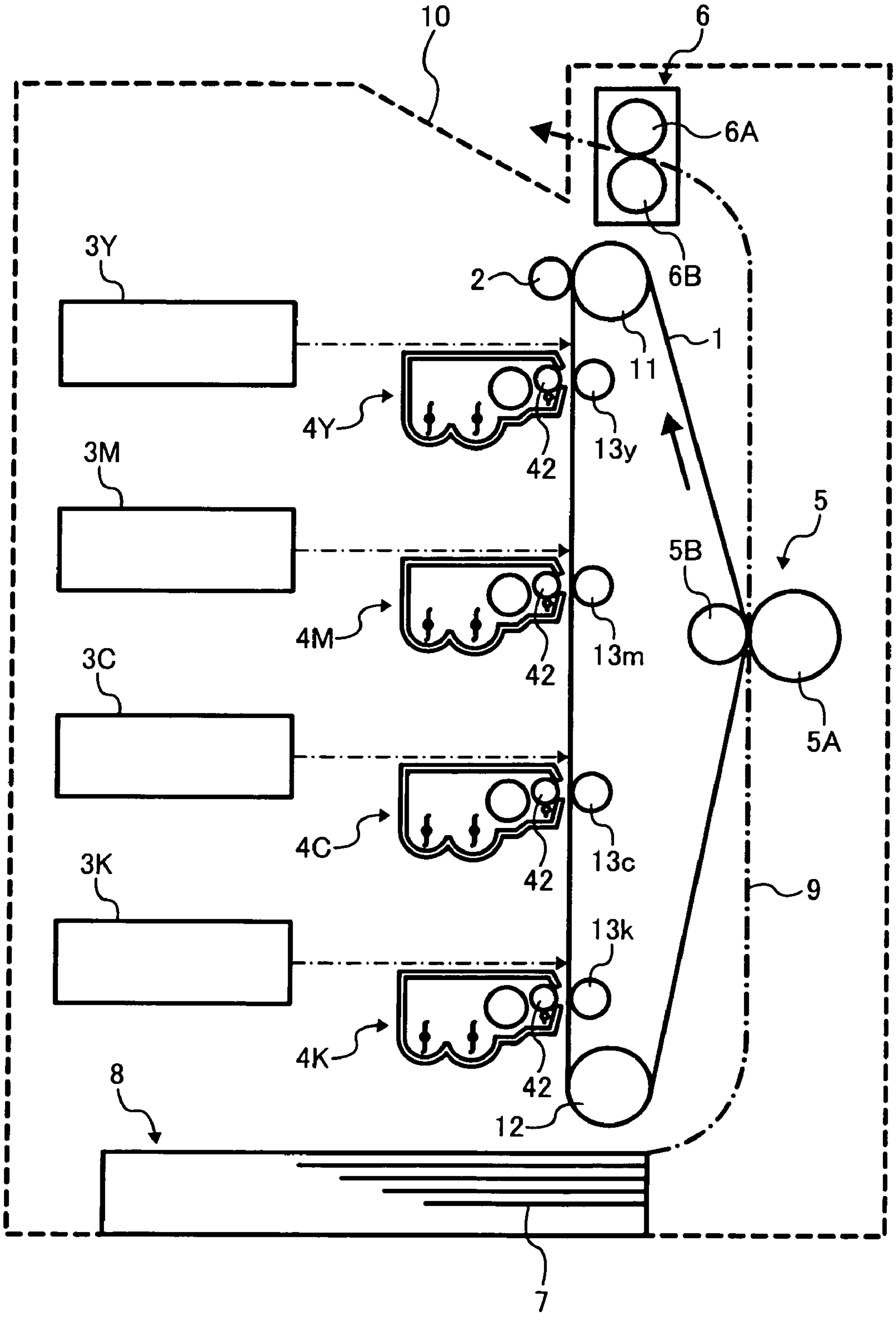
FIG. 1 schematically shows an image forming apparatus capable of forming color image of the present invention.
Figure 2:
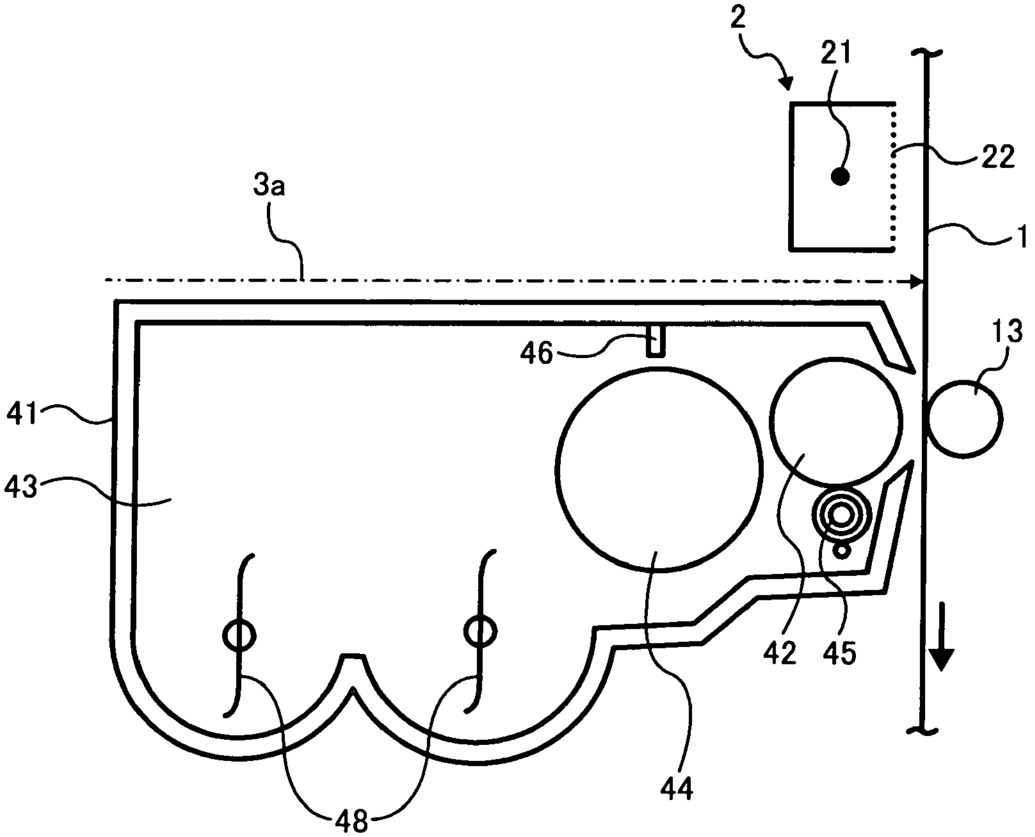
FIG. 2 shows a developing device of the image processing apparatus.

Embodiments of the present invention are described in detail with reference to the attached drawings. FIG. 1 and FIG. 2 schematically show an image forming apparatus configured to form a full-color image. FIG. 1 schematically shows an image forming apparatus capable of forming a color image in an embodiment of the present invention, and FIG. 2 shows a developing device of the image processing apparatus.

The image forming apparatus comprises a belt-shaped photo sensitive conductor (OPC: organic photo conductor) as an image bearing member 1, a contact-type charging roller 2 as a contact-type charging apparatus (a charging device) used to charge the image bearing member 1 uniformly, a developing apparatus 4Y used to adhere yellow toner and develop a latent image that is formed on the image bearing member by a writing apparatus 3Y, a developing apparatus 4M used to adhere magenta toner and develop a latent image that is formed on the image bearing member by a writing apparatus 3M, a developing apparatus 4C used to adhere cyan toner and develop a latent image that is formed on the image bearing member by a writing apparatus 3C, a developing apparatus 4K used to adhere black toner and develop a latent image that is formed on the image bearing member by a writing apparatus 3K, a transferring apparatus 5 used to transfer a full-color toner image that is formed by superimposing each toner image on the image bearing member 1, a fixing apparatus 6, and a sheet feeding apparatus used to house transfer material 7. The four developing apparatuses are located downstream of the charging roller 2 along the rotating direction of the image bearing member 1 (indicated by the arrow in FIG. 1) in order.

The image bearing member 1 is tensioned by means of a transferring roller 11, a driven roller 12, an opposite transferring roller 5B comprising a transferring apparatus 5, opposite members 13Y, 13M, 13C, 13K that oppose the developing apparatuses 4Y, 4M, 4C, 4K respectively, which rotate in the direction indicated by arrow at a rate of 100 mm/sec, for example, by rotation of the transferring roller 11. Note that each developing apparatus will be referred to herein as the developing apparatus 4 when they are not distinguished based on color.

The charging roller 2 is a contact type charging roller 16 mm in diameter, which is formed by laying rubbers 3 mm thick. The value of resistance is adjusted by addition of carbon black.

Writing apparatuses 3Y, 3M, 3C, and 3K write the latent image of each color sequentially to the image bearing member 1 charged uniformly once by the charging roller 2. Various sorts of devices can serve as the writing apparatus, for example, light scanning apparatus by laser, LED array, etc. Here, each writing apparatus has one 5 mW laser diode, and exposes by modulating the intensity of exposure according to each pixel (power modulation).

The transferring apparatus 5 includes the transferring roller 5A and the opposite transferring roller 5B. The fixing apparatus 6 includes a heat roller 6A and a pressure roller 6B located on the opposite side of the heat roller 6A. As the transferring roller 5A, a roller formed by covering a metal roller, which has applied −500 V for transferring. A semi-conductive rubber layer 3 mm thick can be used, for example.

In case the image forming apparatus serves as a copier, image information loaded from a scanner (not shown) is exchanged to write data treated with various sorts of image data processing, for example, A/D exchange, MTF correction, gray-scale processing, and so on. In case the image forming apparatus serves as a printer, such image information as page-description language or bit-mapped image and so on, is exchanged to write data treated with various sorts of image data processing.

Before forming of an image, the image bearing member 1 starts to rotate in the direction of the arrow in FIG. 1 in order that the surface movement speed reaches a predetermined level. Then, at the proper moment, the image bearing member is charged uniformly once by the charging roller 2, and the writing apparatus 3Y exposes according to the write data of yellow by illuminating laser beam 3*a* (referring to FIG. 2) on the charged image bearing member 1. More specifically, changing electric potential in the region of image portion by illuminating imposes the potential difference from a non-image portion that is not illuminated. The electrostatic latent image is produced from this potential difference. Next, yellow toner is adhered on the image portion of the electrostatic latent image by the developing apparatus 4Y. As a result, a yellow toner image is formed on the image bearing member 1.

In the same way, the writing apparatus 3M exposes according to the write data of magenta by illuminating laser beam 3*a*, after which the electrostatic image for magenta is formed. Magenta toner is adhered on the image portion of the electrostatic latent image by the developing apparatus 4M. As a result, toner image is formed on the image bearing member 1 by superimposing magenta toner image on the yellow toner image. Furthermore, the toner image is formed on the image bearing member 1 by superimposing cyan toner image on the image made of yellow toner and magenta toner. Finally, the toner image of full-color is formed on the image bearing member 1 by superimposing black toner image on these three toner image.

At the proper moment the transfer material 7 is fed from a sheet feeder 8, and carried through a feed route 9. The toner image formed on the image bearing member 1 is transferred to the transfer material 7. Furthermore, the fixing apparatus 6 fixes the transferred image, after which the transfer material 7 formed with a full-color image thereon is ejected to a paper ejection part 10.

Referring to FIG. 2 also, the detail about the developing apparatus 4 is described. FIG. 2 is an enlarged diagram showing the developing apparatus in the image forming device.

The developing device 4 has an electrostatic transporting member (electrostatic transporting roller) 42 that is roll-shaped, a housing part 43 where toner is received, a supplying roller (a developer bearing member) 44 to serve as a supplying device used to supply the electrostatic transporting roller 42 with toner particles in the housing part, and a recovery roller 45 used to recovery the toner carried by the electrostatic transporting roller 42. The above device is contained in a case 41. The electrostatic transporting roller operates to transfer powdered state toner by means of the phase-shifted electric field for developing the electrostatic latent image formed on the image bearing member 1.

The supplying roller (a developer bearing member) 44 is arranged with a settled magnet inside. The developer in the housing part 43 is supplied to the surface of the supplying roller 44 by the rotation and magnetic attraction of supplying roller 44 and an agitate screw 48. The thickness of developer on the supplying roller 44 is restricted to a given quantity by a developer layer thickness controlling device 46 placed opposite a circumference of the supplying roller 44. The developer supplied by the supplying roller 44 is carried to the region opposite the electrostatic transporting roller 42 according to the rotation of the supplying roller 44.

Here, the supplying roller 44 is applied with an electric potential by means of a voltage applying device (not shown). And the electrostatic transporting roller 42 is applied with an electric potential for forming transporting electric field by means of a voltage applying device (a driving circuit) that is described later.

Accordingly, an electric field between the electrostatic transporting roller 42 and the supplying roller 44 is created in the region where the supplying roller 44 faces the electrostatic transporting roller 42. Receiving the electrostatic force from this electric field, the negatively charged toner dissociates from the carrier, and moves toward the surface of the electrostatic transporting roller 42. The toner that has reached the surface of the electrostatic transporting roller 42 is transported to the surface of the electrostatic transporting roller 42 by means of the transporting electric field (phase shift electric field) formed by the voltage applied to the electrode. In the present invention, the method of supplying charged toner to the electrostatic transporting roller 42 is not limited to the above-noted bi-component type development. Alternative methods of development are available; for example, mono-component type, charge-injection type, and supplying from stored toners that are charged, etc.

During image processing, the electrostatic transporting roller 42, which has a plurality of electrodes used to form the electric field for transferring, developing, and recovering toner, is placed opposite the image bearing member 1 in a non-contacting state with a nearest distance of 50-1000 micrometers, optimally 150-400 micrometers. In this embodiment, the distance is 300 micrometers.

Figure 3:
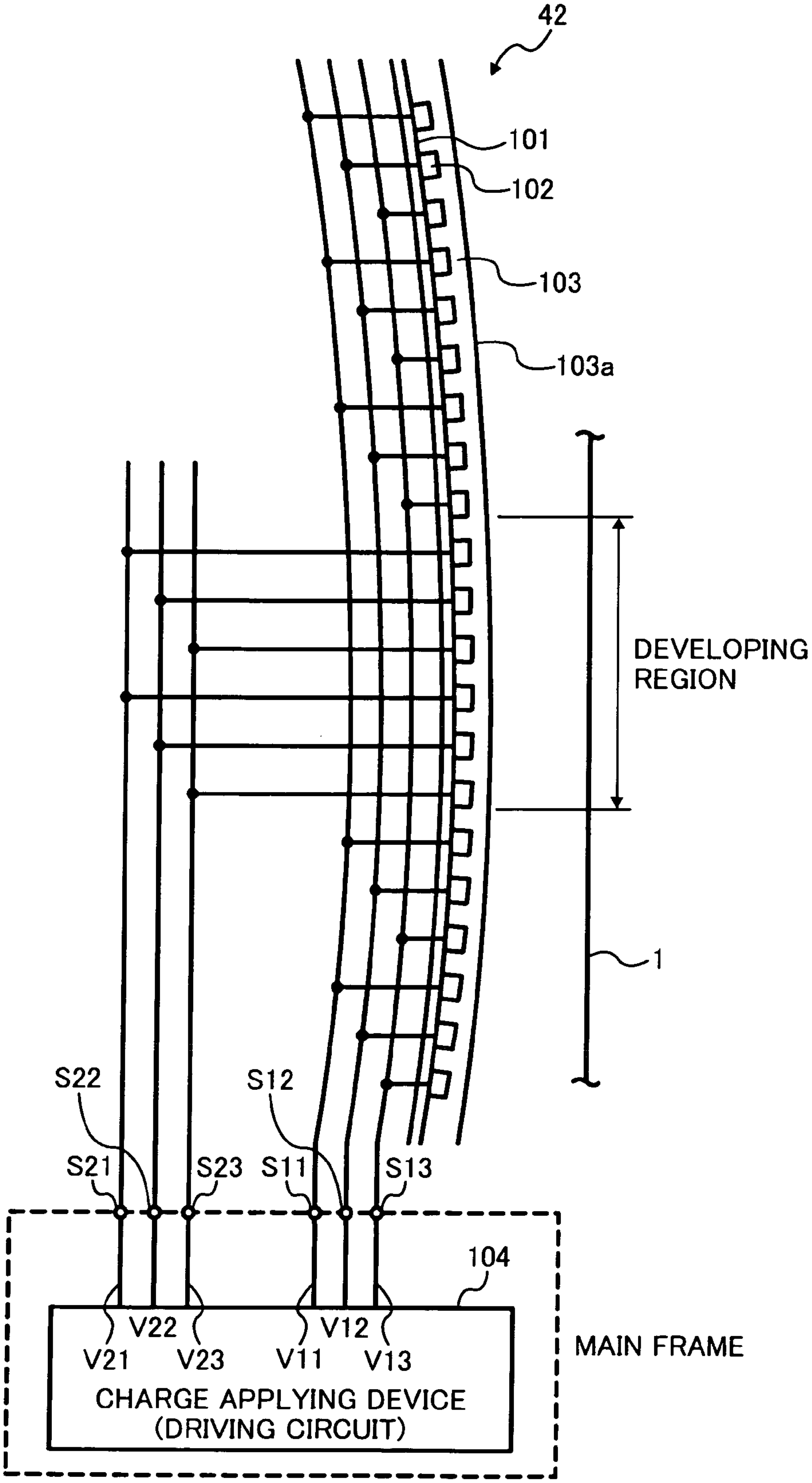
FIG. 3 shows an enlarged view of an electrostatic transporting roller.

FIG. 3 is an enlarged diagram showing the surface facing the image bearing member 1 of the above-noted electrostatic transporting roller 42. The electrostatic transporting roller 42 includes a plurality of electrodes 102, which are arranged on a support substrate 101 at intervals along the direction of transporting toner in sets of n. The top of each electrode is laminated with a surface protection layer 103 mode from inorganic or organic insulating material. The surface protection layer 103 serves as an insulating electrostatic transporting surface forming part that forms an electrostatic transporting surface 103*a*, and also as a protection layer covering the surface of each electrode 102. In this embodiment, intervals between each electrode are 60 micrometers, and the width of electrode is 30 micrometers.

As the above-noted support substrate 101, the following sorts of substrate can be used: a substrate made from an insulating substrate, for example, resin substrate or ceramic substrate; a substrate structured from substrate made from material having conducting properties, for example Steal USE Stainless (SUS), that is covered with insulting film, for example $SiO_2$; and a substrate structured from flexible material, for example, polyimide film. The electrode 102 is formed by forming a conductive material film 0.1-10 micrometers thick, optimally 0.5-2.0 micrometers thick, and then developing a desired pattern of electrodes, for example, using a photolithographic technique. For example, Ni—Cr can be used as a conductive material. The surface protection layer 103 is formed by forming film 0.5-10 micrometers thick, optimally 0.5-3 micrometers thick. For example, $SiO_2$, $TiO_2$, $TiO_4$, SiON, BN, TiN, or $Ta_2O_5$, can be used as the material of protection layer 103.

In FIG. 3, lines leading out of the electrode 102 indicate conducting wires used to apply voltage to each electrode 102. And sites marked by a black circle of crossover sites indicate places connected electrically, and other sites indicate an insulation state. A driving circuit (a voltage applying device) 104 of the main frame is configured to apply n-phased different driving voltages to each electrode 102. In this embodiment, three phased driving voltage is applied (m=3). However, any natural number m>2 may have applicability on the condition that toners are carried properly.

In this embodiment, each electrode 102 is connected to any of contact points S11, S12, S13, S21, S22, or S23 of the developing apparatus 4. S11, S12, S13, S21, S22, and S23 are connected respectively to the voltage applying device 104, which gives driving waveforms V11, V12, V13, V21, V22, and V23, of the main frame in the condition that the developing apparatus 4 is loaded on the image processing apparatus.

The electrostatic transporting roller 42 carries toner to the proximity of the image bearing member 1. The electrostatic transporting roller 42 is divided into a development region used to form the toner image by adhering toner to the latent image on the image bearing member 1, and a transporting region used to recovery toner that is transported to the transporting region without being used for development through the development region.

The development region exists only in the adjacent region to the image bearing member 1, and the transporting region exists in the whole area on the electrostatic transporting roller 42 except for the development region. In this embodiment, a region where toner is available to move by phase-shift electric field is referred to as an "electrostatic transporting surface". In this embodiment, the whole surface of the electrostatic transporting roller 42 is an electrostatic transporting surface.

In the transfer region, driving waveforms V11, V12, and V13 are applied by the voltage applying device 104. In the development region, driving waveforms V21, V22, and V23 are applied by the electrodes 102.

In the following, the principle of electrostatic transporting of toner with the electrostatic transporting roller 42 is described. Applying n-phased driving waveforms to a plurality of electrodes 102 of electrostatic transporting roller 42 generates the phase shift electric field (traveling wave electric field) by the plurality of electrodes 102. Charged toner on the electrostatic transporting roller 42 moves in the direction of transfer while receiving a repulsive force and/or an attractive force.

Figure 4:
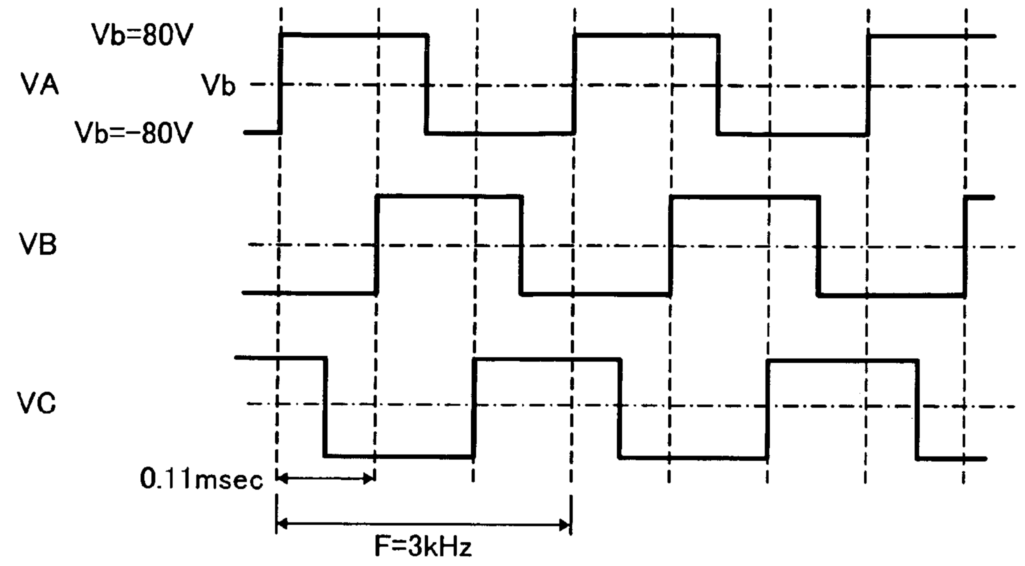
FIG. 4 shows a driving waveform applied to the electrostatic transporting roller.
Figure 5:
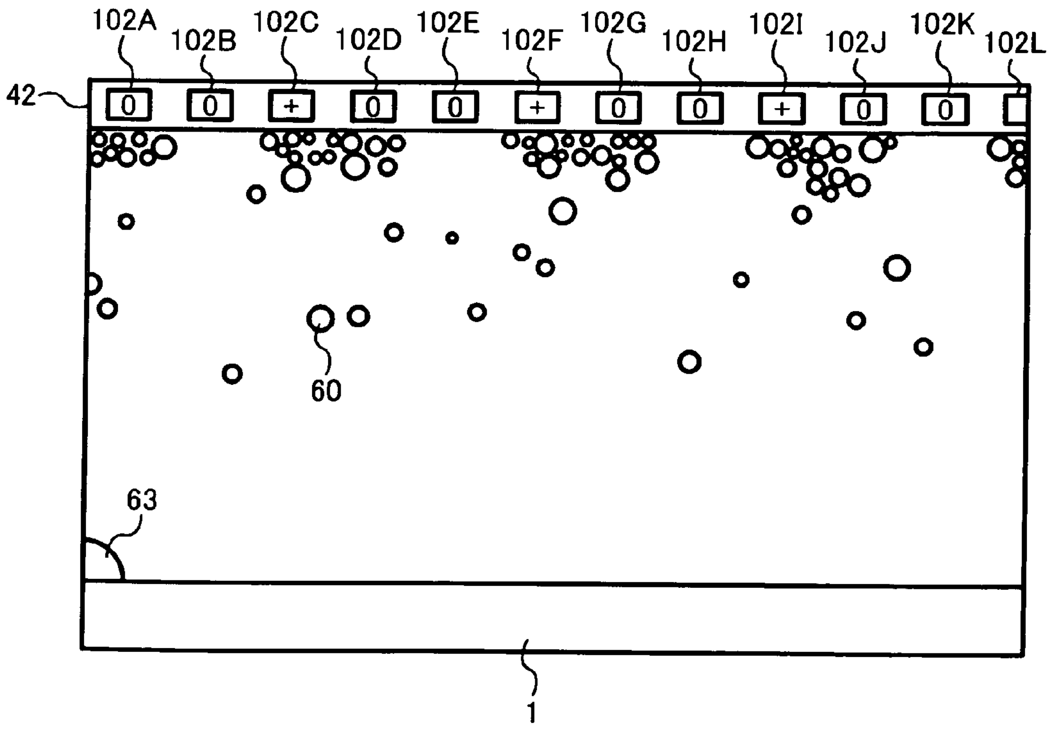
FIG. 5 schematically shows a simulated time change of toner position in EH development.
Figure 6:
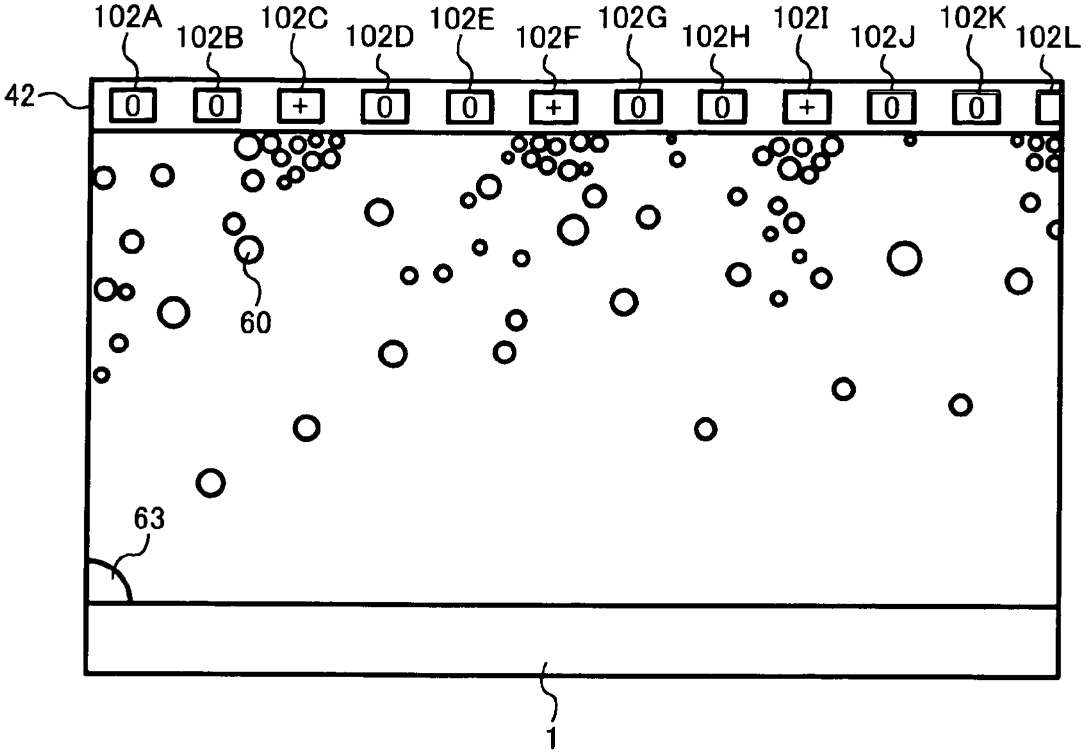
FIG. 6 schematically shows a simulated time change of toner position after that shown in FIG. 5.
Figure 7:
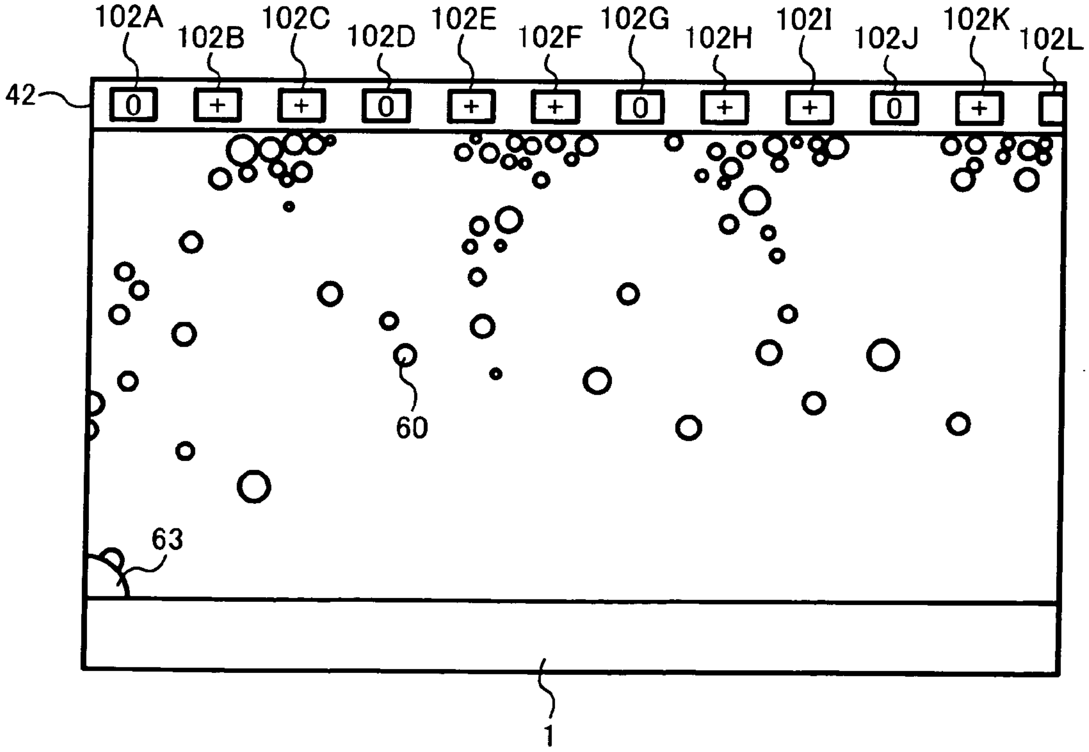
FIG. 7 schematically shows a simulated time change of toner position after that shown in FIG. 6.
Figure 8:
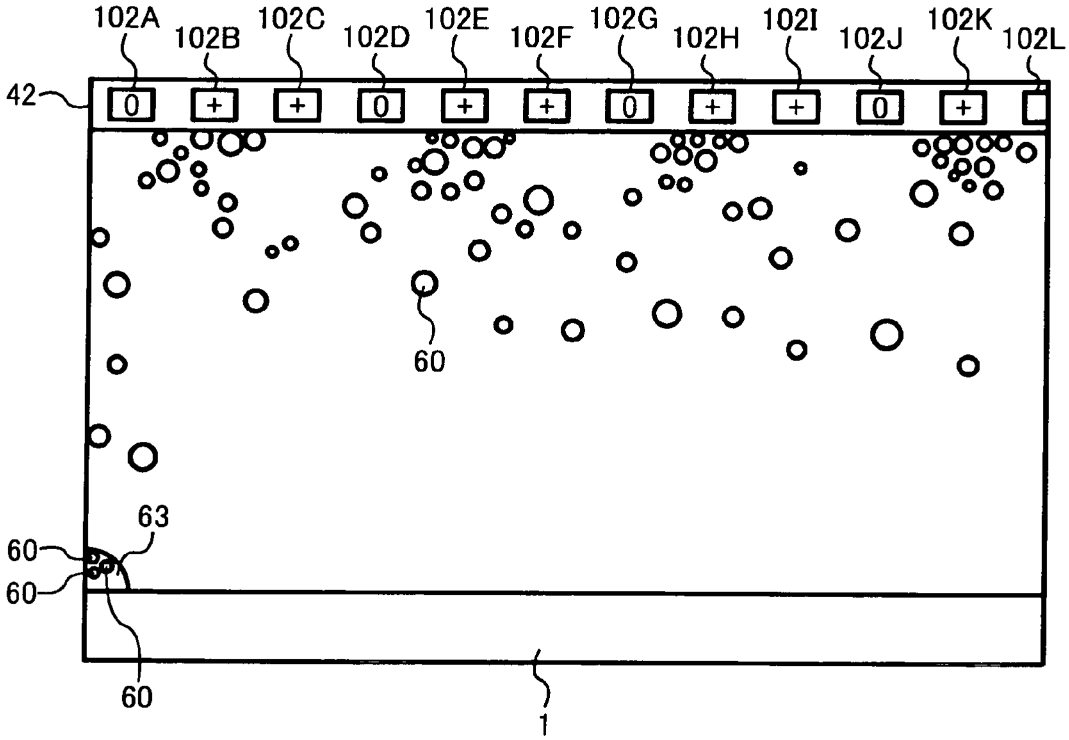
FIG. 8 schematically shows a simulated time change of toner position after that shown in FIG. 7.

For example, referring to FIG. 4, three-phase voltage, phase A (VA), phase B (VB), and phase C (VC) is applied as a rectangular wave to three electrodes 102, respectively, wherein the timing of the three-phase waveforms are shifted by 120 degrees. The rectangular wave has peak-to-peak electric pressure of 160V (Duty=50%) and a frequency of 3 kHz. The charged toner moves over on the electrostatic transporting roller 42 while hopping in sync with the traveling wave electric field. The average amount Vb of the traveling wave electric pressure operates similarly to what is called developing bias in the developing region. Phase A (VA), phase B (VB), and phase C (VC) correspond to the above-noted electric pressure V11, V12, V13, V21, V22, and V23.

At this point, the height of toner hopping reaches 200-300 micrometers, so when the electrostatic latent image exists at the height of 300 micrometers from the electrostatic transporting roller 42, hopping toner enter into the electrical field formed by the latent image (image portion) of the image bearing member 1, and travels toward the latent image, and then develop the latent image. As described above, the hopping toner is separated from carriers and are not trapped with carriers. By contrast, in a blank portion, the latent image forms an electric field that generates a force to thrust back toner. So the toner, which travels toward the blank portion (non-image portion), makes a U-turn in mid-course without reaching the image bearing member 1, and is finally recovered by the recovery roller 45. As above, because development is performed with toner that is hopping by electrostatic transporting, this type of development is called Electrostatic Hopping development, or EH development.

Referring to FIG. 5-FIG. 8, a process for this type of development is described in more detail. These figures show the pattern diagrams of the result of a simulation showing the positions of a toner 60 over time in the space formed by the image bearing member 1 and the electrostatic transporting roller 42.

On the OPC (the image bearing member 1), a negative latent image of 600 dpi, wherein 1 dot is 42 micrometers, is formed. Development space 63 is created over the negative latent image by the negative latent image. In addition, if the latent image is larger, the development space spreads to an upper area. On the other hand, the electrostatic transporting roller 42 is arranged with electrodes 102A-102L. The hopping toner 60, which is transported by the electrostatic transporting roller 42, have some distribution about particle diameters and charge quantities. In these figures, this distribution is depicted as circles having different sizes.

When the negative charged toner 60 reaches the space 63, the negative charged toner 60 goes toward the image bearing member 1, and develops one dot of the latent image, because the toner 60 is received with force to orient the toner 60 to the image bearing member 1 in the space 63. In fact, as time advances as shown from FIG. 5 to FIG. 8, it is realized that a part of the toner that is hopped by the transporting roller 42 reaches the development space 63, where it is developed. At the same time, in the portion except for one dot latent image, i.e., blank portion (non-image portion) of the image bearing member 1, it is realized that hopping toner 60 starts to make a U-turn in mid-course to the side of the electrostatic transporting roller 42.

This phenomenon wherein hopping toner is drawn into the latent image (image portion), and are repelled in the blank portion was confirmed using a high-speed camera. In this manner, EH development develops only a latest latent image even if it is a minute image, without disturbance for latent image formed previously in a blank portion of the latest image.

Next, referring to FIG. 9 to FIG. 12, a process of full-color image forming by a one-photo-conductor/one-rotation/one-charge-superimpose-type process in the image processing apparatus is described. The surface potential for original color in each process is explained using actual measurement values, however some parts that are unable to be measured are explained using simulation values.

Figure 9A:
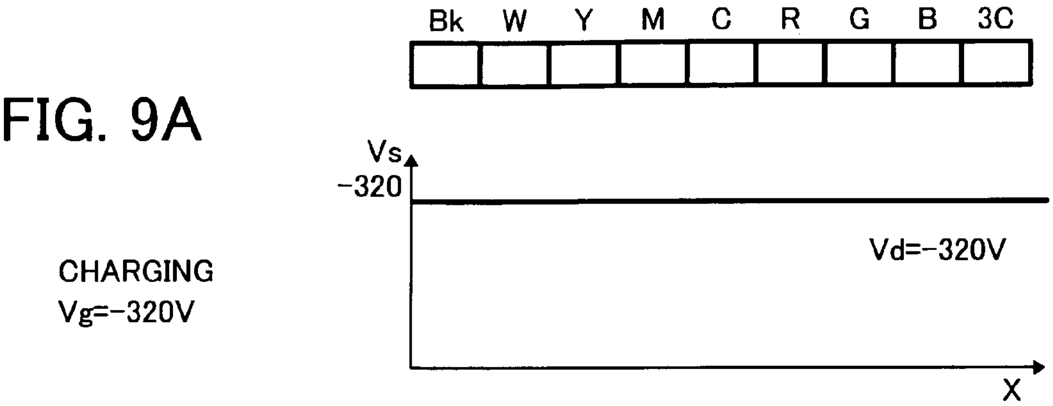
FIGS. 9A-9C schematically show forming an image of the first color when the image forming apparatus forms a color image in a superimpose-type process.

At first, as shown in FIG. 9A, the image bearing member 1 (also referred to as an "OPC belt") is charged with electricity to −320V uniformly by impressing −320V with the power supply (not shown) to the contact-type charging roller 2 in a condition of running at a constant speed at 100 mm/sec. For this case, charging is performed in order that the electric potential is more than a maximum electric potential of the layer of toner that is developed on the OPC belt as the image bearing member. This operation enables superimposing toner images of each color by exposure and development of multiple times per one electrostatic charge.

Figure 9B:
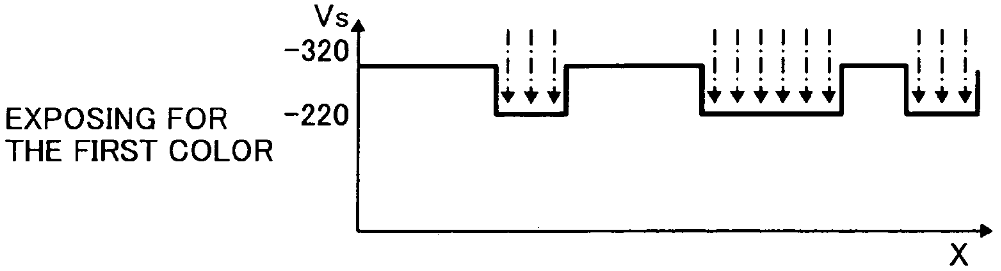

Next, as shown in FIG. 9B, the image is exposed with relative light intensity LI=0.12 by means of the writing apparatus 3Y, and then a yellow latent image is formed. Only the pixels that should be developed with a yellow toner are exposed selectively.

The following includes a description of only nine colors, i.e., six colors of yellow, magenta, cyan, red, blue, and green, in addition to white and two kinds of black, because an explanation of all colors would be very complicated. Two kinds of black are distinguished below. One black, which is formed by superimposing yellow, magenta, and cyan toner, is described as 3C, and the other black, which is formed with only black toner, is described as K.

As shown in FIG. 9B, four kinds of pixels, white (W), magenta (M), cyan (C), and blue (B), and pixel of K that are not developed with a yellow toner, are not exposed. On the other hand, yellow (Y), red (R), green (G), and 3C, which are developed with yellow toner, are exposed. As a result, the potential differences of exposed pixels are decreased 100V from −320V to −220V. In the following explanation, terms, such as "decrease", "increase", "high", "low", are described in absolute value terms.

Figure 9C:
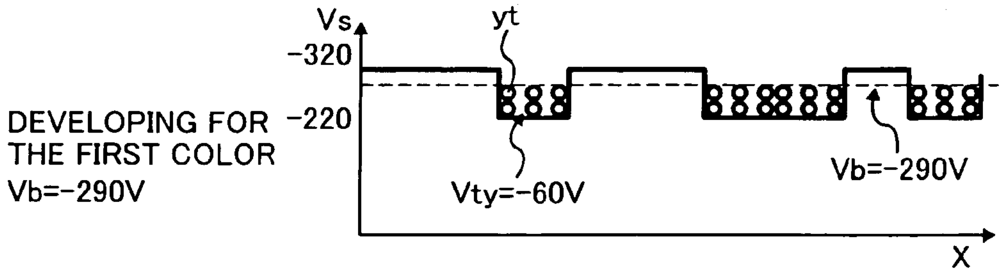

And as shown in FIG. 9C, reverse development is performed for the yellow latent image with yellow toner yt by applying a rectangular wave of −290V+−80V to the electrostatic transporting roller 42 of the developing apparatus 4Y for yellow. At this time, temporal and spatial average potential difference Vb of electrodes 102, which corresponds to conventional development bias, of electrostatic transporting roller 42 is −290V, and a non-image portion (non-exposure) potential difference is −220V. Consequently, negative charged toner, which are made hopping between the OPC belt (image bearing member) 1 and the electrostatic transporting roller 42, goes to an image portion (exposure) pixel in the electrostatic force generated by the electric field between the OPC belt (image bearing member) 1 and the electrostatic transporting roller 42, and adheres thereto.

Then, the potential difference Vty of the toner, which adheres on the OPC (image bearing member), is −60V. In other words, the electric potential of the developed part has been −280V. This −280V is created by adding toner electric potential −60 to the electric potential −220V after exposure. And then the potential of the developed part (−280V) is higher than the potential difference (−220V) after exposure.

Figure 10:
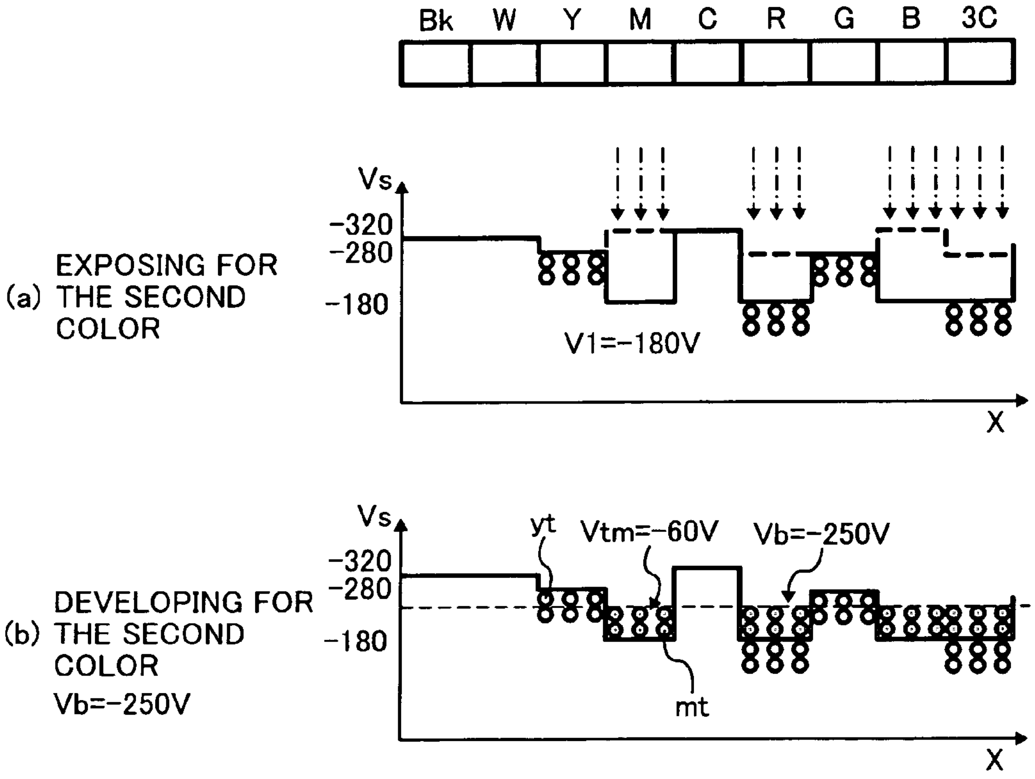
FIG. 10 shows forming an image of the second color when the image forming apparatus forms a color image in a superimpose-type process.

And as shown in FIG. 10(*a*), a magenta latent image is formed by exposure with the writing apparatus 3M. Original colors that have magenta toner as a component are the following four colors, M, R, B, and 3C. The potential difference of each color is different; M and B are −320V, R and 3C are −280V. In addition, the portion of M and B do not have a toner, but a layer of yellow toner yt already exists in the position of R and 3C. Therefore in consideration of this potential difference and transmission coefficient of a yellow toner layer for 780 nm light, the light intensity of the laser beam is adjusted and then the same potential difference after exposure V1=−180V is obtained.

As shown in FIG. 10(*b*), development is performed with magenta toner mt by applying −250V+−80V to the electrostatic transporting roller 42 of the developing apparatus 4M for magenta. Because of reverse development, as with yellow, magenta toner mt adheres to portions of M, R, B, and 3C, whose potential difference is −180V, which is 70V lower than the applied potential difference −250V. The toner potential difference is −60V as above, and each potential difference of these points after exposure becomes −240V.

For this case, there are two kinds of the potential difference of the blank portion, −320V, which corresponds to each original color K, W, and C, and −280V, which corresponds to each original color Y and G. But, as noted above, the differential between these two kinds of potential difference does not cause scumming from adherence of toner on the blank portion, because, in EH development, hopping toner does not get to the blank portion. Although the differential between blank portions is larger as the third and fourth development is performed, the problem of scumming does not come up for the same reason. Furthermore, in EH development, there is not a problem that carriers disturb the yellow toner image formed previously by rubbing since toners is not trapped by carriers.

Figure 11:
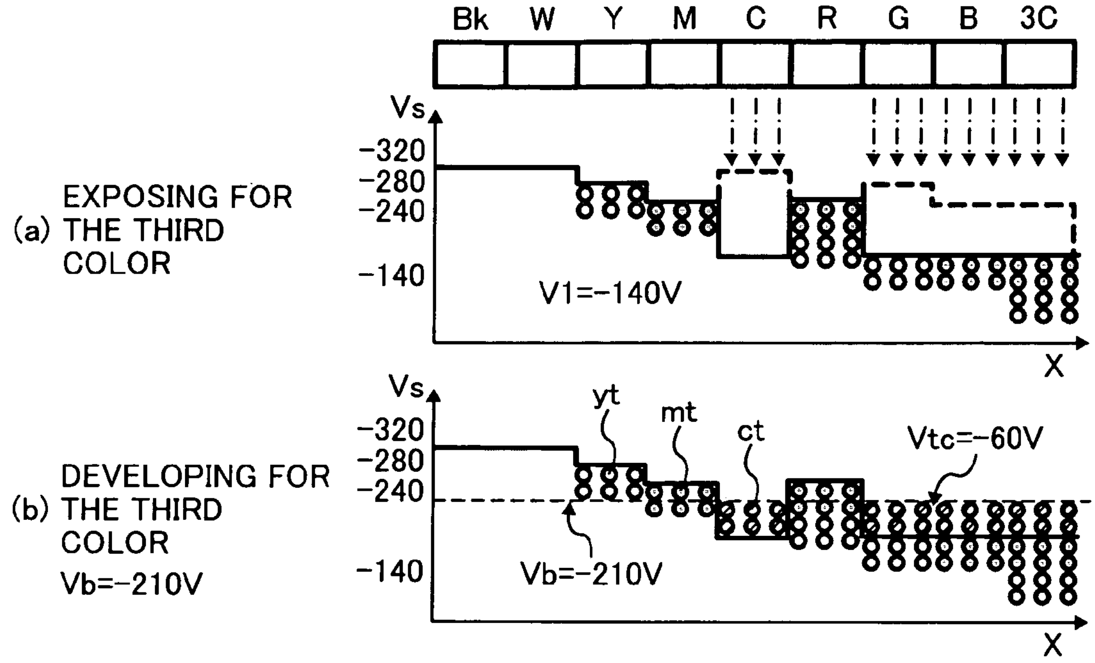
FIG. 11 shows forming an image of the third color when the image forming apparatus forms a color image in a superimpose-type process.

Next, as shown in FIG. 11 (*a*), a cyan latent image is formed by the developing apparatus 4C for cyan. As with writing the magenta latent image, the light intensity is adjusted in consideration of the potential difference of pixels that should be exposed and the pre-adhered toner layer. Next, the cyan latent image is formed by exposure of a laser to make the potential difference after exposure −140V.

And, as shown in FIG. 11(*b*), reverse development is performed for the cyan latent image by applying −210V+−80V to the electrostatic transporting roller 42 of the developing apparatus 4C for cyan with cyan toner ct, same as with development of yellow or magenta toner. The toner potential difference is −60V for each and the potential difference of the developed portion becomes −200V.

Figure 12:
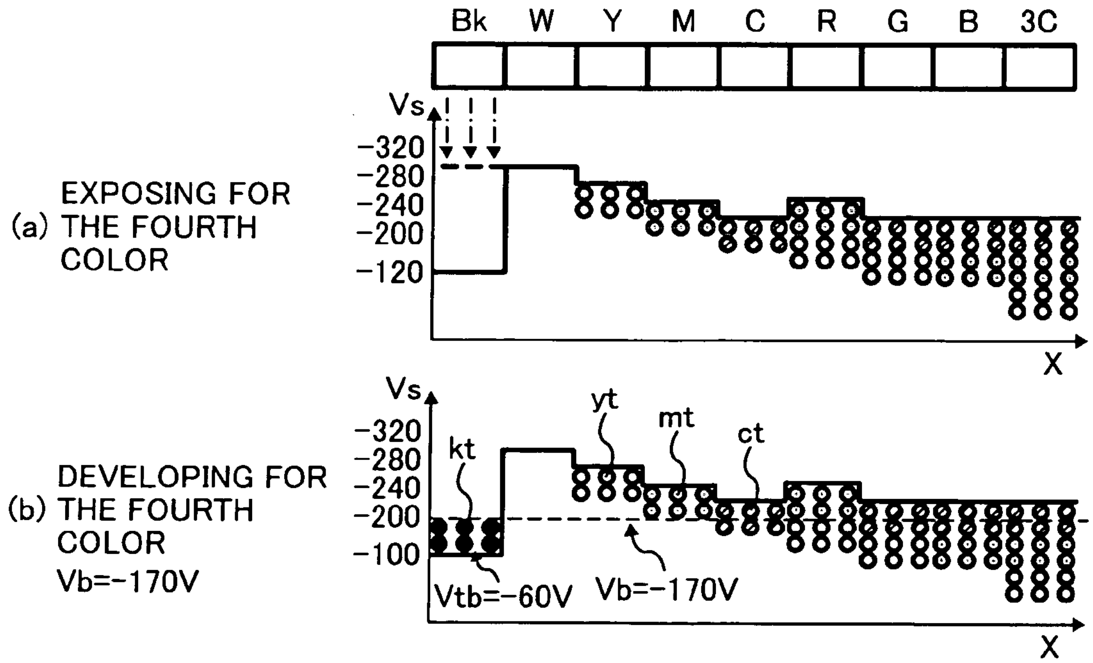
FIG. 12 shows forming an image of the fourth color when the image forming apparatus forms a color image in a superimpose-type process.

In addition, as shown in FIG. 12(*a*), a black latent image is formed on the remaining blank portion for white (−320V) with the developing apparatus 4K for black such that the potential difference after exposure becomes −100V. All the same, it is possible to write a black latent image and to add black toner to the portion where color of Y, M, C, R, G, B, and 3C have formed already.

As shown in FIG. 12(*b*), reverse development is performed for the black latent image by applying −170V+−80V to the electrostatic transporting roller 42 of the developing apparatus 4K for black with black toner kt, and then a black toner image is formed on the white blank portion.

In this way, a full-color print is formed by charging once, exposure (forming a latent image), and development four times, transferring a full-color toner image formed on the OPC belt 1 by applying transfer potential difference −500V to the transferring roller 5, and fixing by the fixing apparatus 6.

Reflection density of the above provided full-color print was around 1.6 when it was measured in a Macbeth densitometer, and it exceeded the target value of 1.4. There was no scumming, and the reflection density of the blank was 0.06, equal to the paper. The ozone concentration inside the image forming apparatus is almost 0.

In EH development, toner is made hopping, and transferred to a close position to the latent image on the image bearing member by electrostatic transporting. At that point, there can be two kinds of electric fields corresponding to a portion of the latent image. It is determined that each toner is attracted to a portion of the image, or repelled from the portion of a blank portion based on the electric field, and then development is performed. So the development sensitivity of EH development is higher than one of the conventional development method. The above advantages concerning reflection density and ozone concentration come from this higher development sensitivity of EH development.

Figure 13:
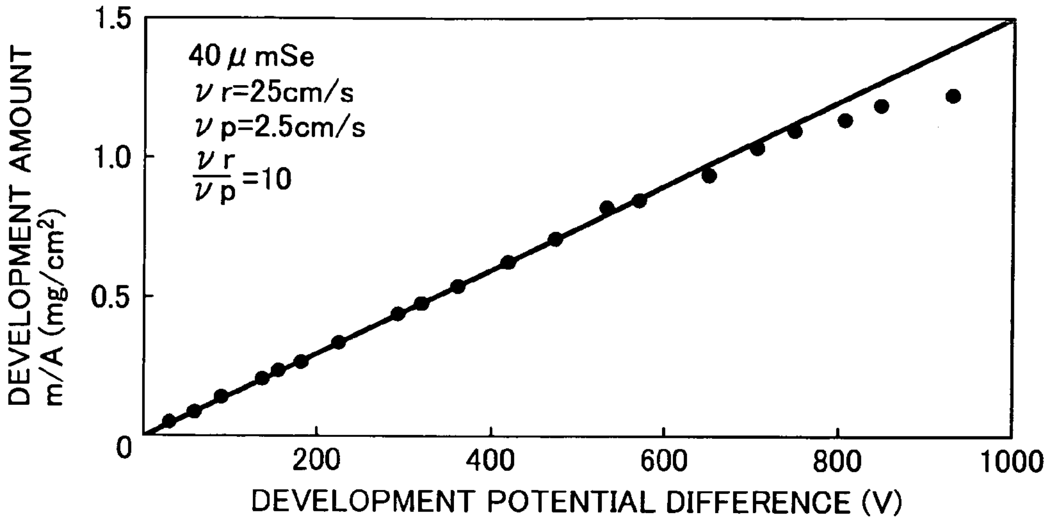
FIG. 13 shows development amount m/A per unit area of toner for development potential difference in a conventional developing method.

Next, the relationship between a conventional bi-component development method and EH development is explained. In the bi-component development method (magnetic brush development), which is a representative example of a conventional development method, a development amount m/A per unit area of toner for development potential difference is shown in FIG. 13, for example ("Electrophotography Principles and Optimization", author: Merlin Scharfe, translator: Fuji Xerox Research Institute, publisher: CORONA PUBLISHING CO., LTD.)

The image density required for normal printing is 1.4, and the toner mass m/A per the unit area required to get the image density is 0.5 mg/cm$^2$. In other words, in conventional magnetic brush development, 300V is required as the potential difference for development, which is the differential between the potential difference of an image and the development bias. This is required for developing, i.e., for separating carriers from toner and adhering the toner to the image portion of the OPC latent image. In fact, a differential of the same volume is required for separating toner, which adheres to a blank portion on the OPC for some reason, from OPC and getting back to the magnetic brush. A combined potential difference of 600V is required.

Thus, in image forming devices such as a normal printer or a copier, development is performed by charging −700V to the image bearing member, exposure to make the potential difference of the image portion −100V, and applying −400V as a development bias.

Therefore, within the scope of the conventional development method, if image forming was tried in the one-photo-conductor/one-rotation/one-charge-superimpose-type process, the charging device of the image bearing member is needed to be larger than −1800V. In this case, the electric field impressed to photo conductor becomes 3 times the normal value, and it shortens the lifetime of the photo conductor greatly. Triplication of thickness of the photo conductor makes the electric field impressed to the photo conductor the same level as the normal level. But in the case of a dual-layered OPC, which is a kind of conventional OPC that has a charge generation layer under the charge transport layer, as positive holes generated by light transport, these diffuse broadly in the charge transport layer of triple thickness. Consequently, a formed image is so blurred that it is not acceptable for practical use.

As a practical matter, even in jumping development that is a non-contact type development, almost the same potential difference described above is necessary to separate off toner from carriers and to separate off toner that adheres to a blank portion in the reverse direction. In fact, some toner adheres to a blank portion because toner is reciprocating intensively between carriers and the image bearing member despite non-contact type development.

Figure 14:
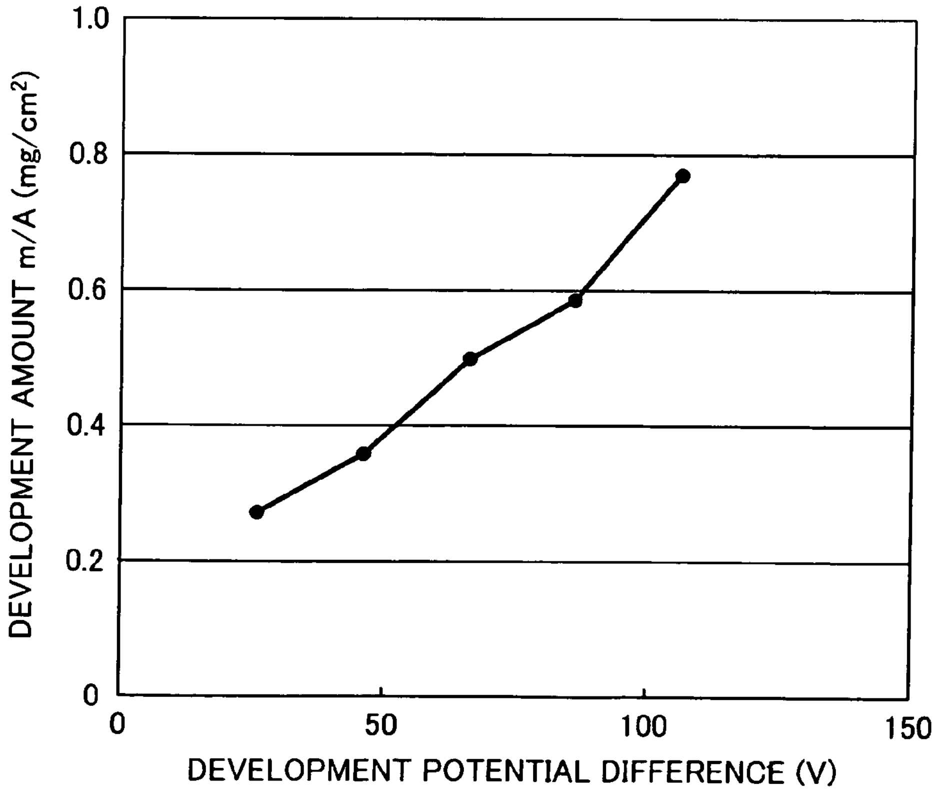
FIG. 14 shows development amount m/A per unit area of toner for development potential difference in an EH developing method.

In contrast, in EH development, the development sensitivity is high at all as shown in FIG. 14. FIG. 14 shows that the required development potential difference to get m/A=0.5 $mg/cm^2$ per unit area is only 70V. In addition, because in EH development toner does not contact with a blank portion, a strong electric field required to recovery toner is unnecessary. All that is required is an electric field for recovering hopping toner moderately. For this purpose, in the above embodiment, 30V is spared, but 10V is sufficient in practice. Even in the case of 10V, scumming does not occur.

Therefore, although in the above embodiment the potential difference for the initial charge is 320V, a charge of an even lower potential difference is able to form a proper image in practice.

In addition, though FIG. 14 shows a case in which the average ratio charge q/m is −23 μC/g, as q/m decreases, the required development potential difference to get m/A=0.5 $mg/cm^2$ per unit area decreases pro rata. In view of this, it is possible to form a proper image with a lower potential difference.

As thus described, the image forming apparatus comprises a charging device configured to charge an image bearing member that is moving, a writing device configured to form a latent image in a lower course of said charging device by exposing for each color according to image information, and a developing device configured to develop the latent image with toner. Exposure and development is performed more than once by the writing device and the developing device to the image bearing member that is charged once by the charging device so that color image is formed from superimposed toner of each color on the image bearing member. This operation enables the image forming apparatus to form a full-color image in a one-photo-conductor/one-rotation/one-charge-superimpose-type process, which has the following advantages: easy construction, lower cost, and easy maintenance.

Further, toner is not trapped by carriers, so the toner image developed previously is not rubbed and disturbed with carriers so that the quality of the image can be improved. In addition, an EH developing device is used as developing device. The EH developing device is a device to develop by making toner hopping with a phase-shifting electric field, so that a high quality image without scumming can be formed in a one-photo-conductor/one-rotation/one-charge-superimpose-type process. Furthermore, the charging device to charge the image bearing member is a contact type developing device, so the amount of generated ozone can be reduced.

Next, as another embodiment of the invention, an example is described that a one photo conductor/one-rotation/one charge superimpose-type process is performed not in EH development, but in a conventional development method, for example, a contact type magnetic brush method or a non-contact jumping method. In the conventional development, toner contacts with a blank portion also, unlike in EH development.

In the above-mentioned embodiment, even the electric potential of a blank portion is left uneven during four times development, and then a clean image can be obtained for EH development. On the contrary, in the above conventional development method, if a potential difference exists in a blank portion, toner that arrives at the blank portion gets tied up and then contributes to scumming. So the electric potential of blank portion is required to be uniform. In this embodiment, the electric potential of blank portion is operated to be uniform using image exposure.

At first, as a charging apparatus, a scorotron charging device that has two wires and 30 mm width is used instead of the charging roller 2 in the above embodiment. Further, as a developing apparatus, a bi-component soft-touch developing device is used instead of the developing apparatus 4 that performs EH development. The soft touch development is implemented in reducing an amount of digging into a development surface using an extended magnet brush. The same toner as in the above embodiment is used, and its charge amount is the same also.

Referring now to FIGS. 15-18, image forming in another embodiment is explained in changing a potential difference based on observation and simulation, same as in the above-mentioned embodiment.

Figure 15:
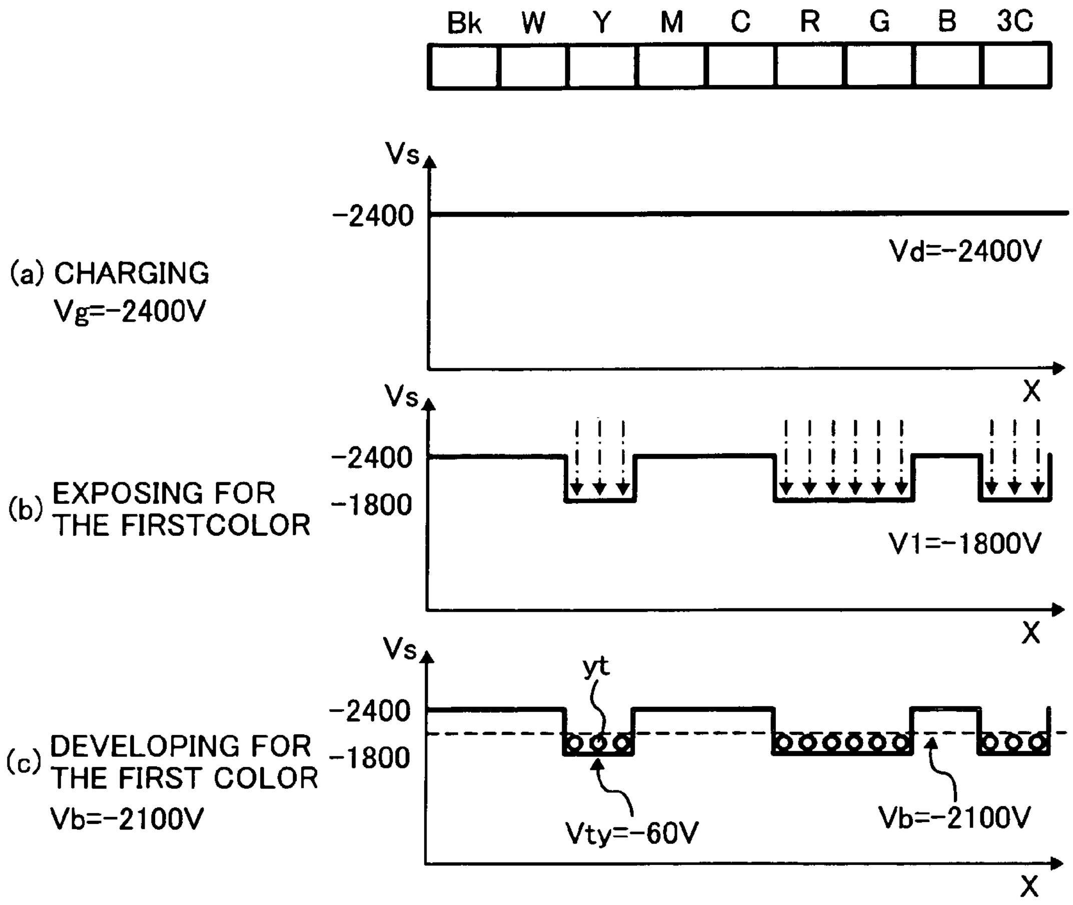
FIG. 15 shows forming an image of the first color when another image forming apparatus forms a color image in a superimpose-type process.

At first, as shown in FIG. 15(*a*), the surface of OPC belt 1 is charged by the scorotron charging device, and then gains −2400V.

Next, as shown in FIG. 15(*b*), a yellow latent image is written in the charge surface by the writing apparatus 3Y for yellow, and then a potential difference of image (exposure) portion is −1800V. In fact, in this embodiment, an image is formed with a reverse development method, that is, reducing the absolute value of the potential difference of an image portion pixel to less than the potential difference of a non-image portion pixel that forms a blank portion by exposing an image portion that should have adhered toner in a next development, and then adhering toner thereto.

Next, as shown in FIG. 15(*c*), reverse development is performed by a soft touch bi-component develop device at developing bias Vb=−2100V with yellow toner yt. The potential difference after development is the same 60V as in the foregoing embodiment, so that the potential difference of a portion adhered with toner becomes −1860V. In addition, the size of toner in the explanation diagram of the foregoing embodiment is almost the same as a depth of toner potential difference. But drawing in the same way as in the foregoing embodiment, toner becomes too small to view easily. So, in diagrams of this embodiment, the size of toner is drawn in a larger size properly.

Figure 16:
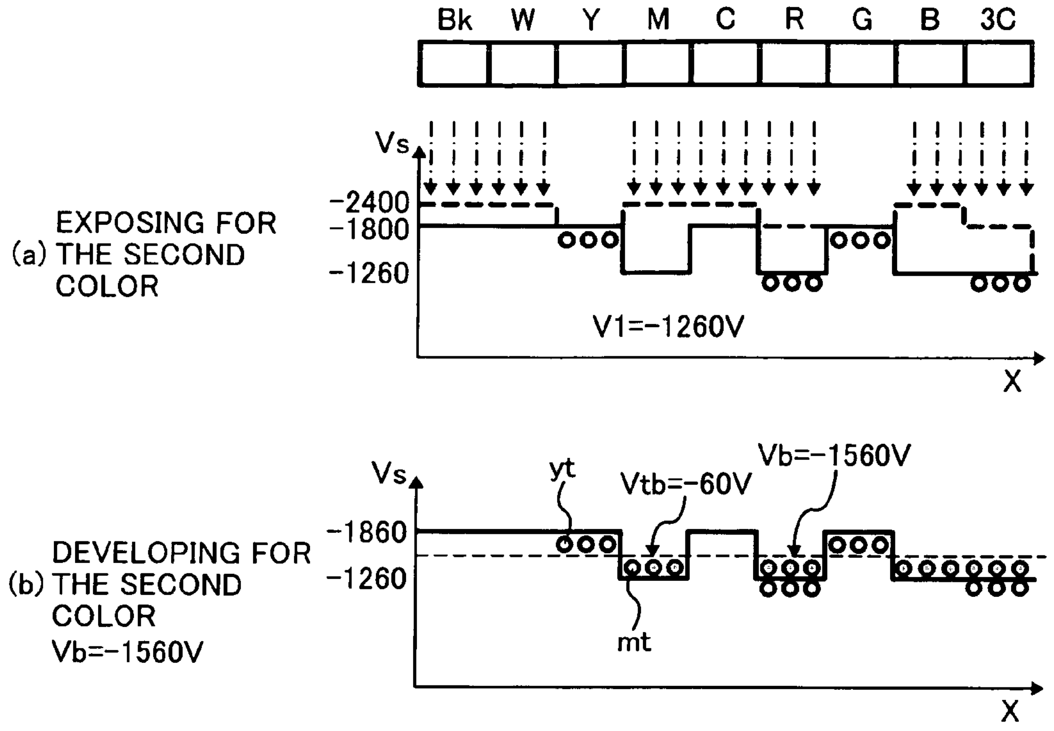
FIG. 16 shows forming an image of the second color when the image forming apparatus forms a color image in a superimpose-type process.

As shown in FIG. 16(*a*), the potential difference is reduced to −1260V by writing a magenta latent image with the writing apparatus 3M for magenta. At this time, there are parts which yellow toner yt has already adhered to (corresponding to original color R or 3C) and parts without toner (corresponding to original colors M or B). The laser light intensity is changed according to each part, and then exposure is performed so that an identical surface potential −1260V is gained.

In addition, a part left as −2400V (corresponding to original K, W, C) is exposed by a weaker laser beam so that the potential difference of the blank portion is adjusted into a potential difference of −1860V of the part developed with yellow. Writing of a magenta latent image and exposing for adjusting the potential difference of the blank portion can be performed by an identical laser simultaneously.

In addition, reverse development is performed with magenta toner mt at a development bias of −1020V by a soft touch bi-component developing device in the same way.

Figure 17:
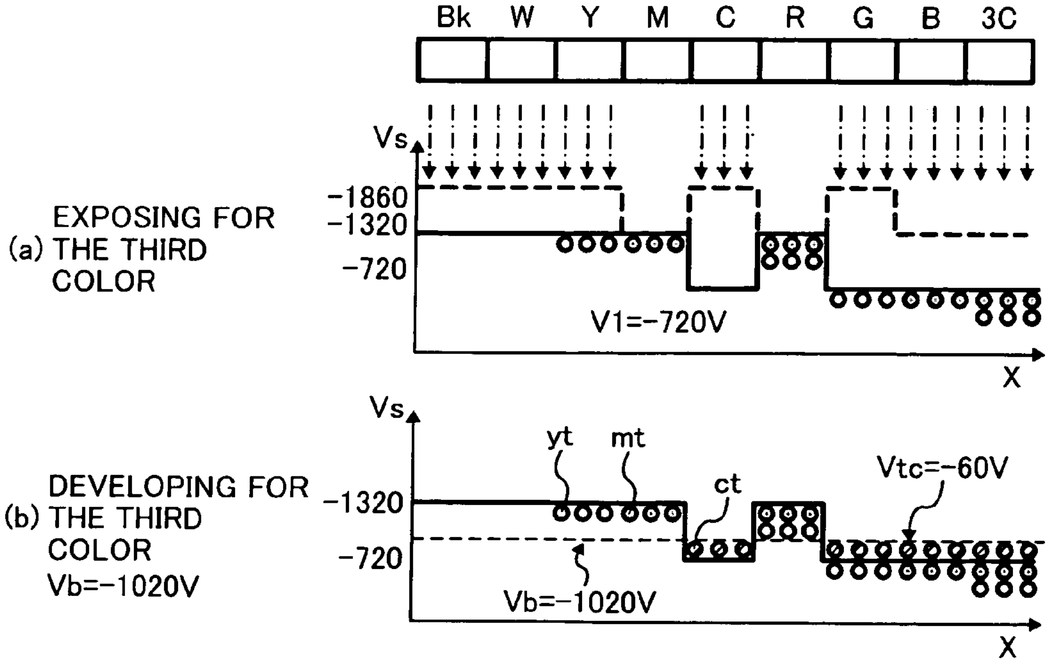
FIG. 17 shows forming image of the third color when the image forming apparatus forms a color image in a superimpose-type process.

As shown in FIG. 17(*a*), a cyan latent image is written by the writing apparatus 3C for cyan, and exposure for forming a uniform electric potential in a blank portion is performed simultaneously. In fact, laser light is illuminated with an adjusting light intensity according to an electric potential before exposure and toner adhering amount, so that the electric potential of a blank portion becomes −1320V, and the electric potential of the image portion becomes −720V.

As shown in FIG. 17(*b*), reverse development is performed with cyan toner ct at a development bias of −1560V by a soft touch bi-component developing device in the same way as described above.

Figure 18:
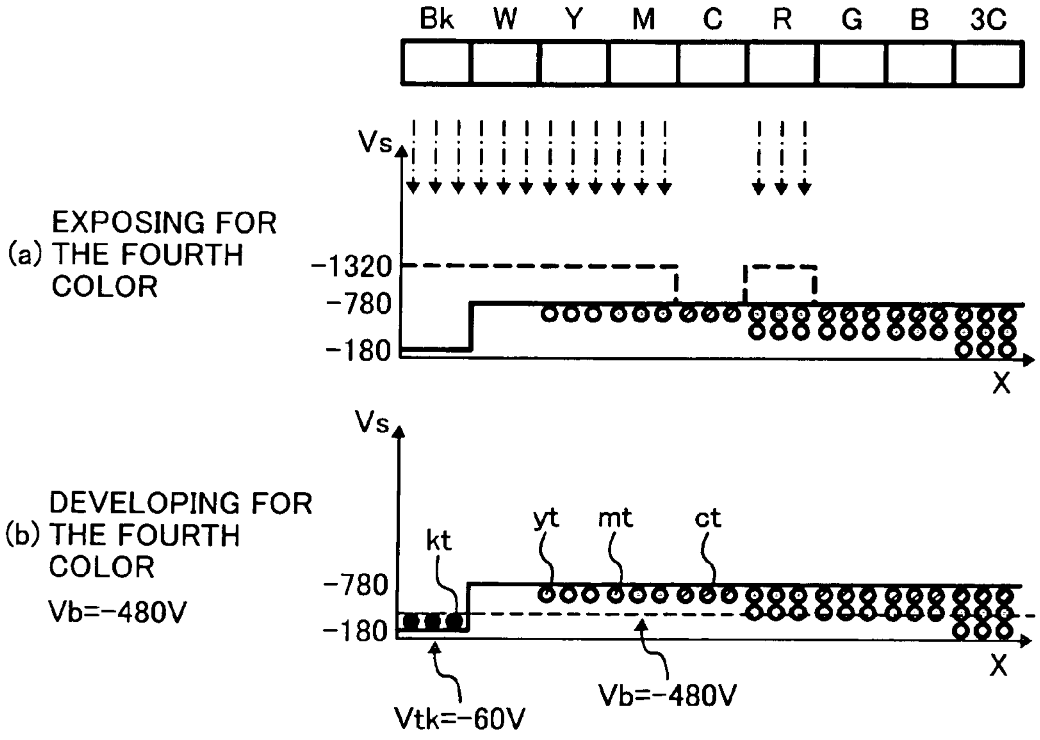
FIG. 18 shows forming image of the fourth color when the image forming apparatus forms a color image in a superimpose-type process.

Finally, as shown in FIG. 18(*a*), a black latent image is written by the writing apparatus 3K for black, and exposure for forming a uniform electric potential in a blank portion is performed simultaneously. Here writing to the blank portion for white is described. However, it is possible to form black toner on color toner images that have formed already (corresponding to original colors Y, M, C, R, G, B, 3C) in piles. Laser light is illuminated in the same way as above described for Y, M, or C, so that the electric potential of blank portion becomes −780V and the electric potential of image portion becomes −180V.

As shown in FIG. 18(*b*), reverse development is performed with black toner kt at a development bias of −480V by a soft touch bi-component developing device.

After that, the full-color image formed on the OPC belt is transferred to the transfer material 7 by applying −1.5 kV to the transferring roller, and the image is fixed through the fixing apparatus 6.

In this way, same as in the above embodiment, full-color image can be formed in one charge.

However, one of the formed images had a rubbed pattern, and did not show high sharpness, because a toner image formed earlier, for example, the yellow toner image is rubbed by magnetic brush of the next magenta development even in soft touch development. In addition, as printing is performed repeatedly, a color mixture of toner is generated. For example, yellow toner comes to be mixed in the developing apparatus for magenta. Moreover, for each color, the number of spot images, which is said to be caused by electric breakdown of the photosensitive conductor, increased gradually. A spot image is a spot that is supposed to be formed as an image, but remains not formed finally. Consequently, it is speculated that the charge electric potential difference is beyond the permissible level of the OPC 20 micrometers thickness. In addition, the ozone density was considerably high, and did not make much difference from the four-times-charge type process.

In other words, as in a conventional development method, formation of a full-color image by the one-photo-conductor/one-rotation/one-charge-color-superimpose-type process is possible. However, it is not practical, as described above, although it allows for slight miniaturization of the image forming apparatus.

As described above, in the case of conventional development, in exposure for illuminating to a blank portion a forming pixel that has a higher electric potential in absolute value than another blank potion forming pixel of blank portion pixels that are formed in a second or later exposure is performed at the same time as exposure for illuminating to an image portion is performed, so that an electric portion of the blank portion forming pixel becomes the same level as the an electric potential of the another blank portion. This operation enables prevention of scumming, even in conventional development in which toner also contacts with blank portions.

In this case, it is possible also that exposure for illuminating to a blank portion forming pixel that has a higher electric potential in absolute value than another of blank portion pixels that are formed in a second or later exposure is performed before or after of exposure for illuminating to an image portion is performed using another optical system of exposure, so that an electric portion of the blank portion forming pixel becomes the same level as the electric potential of the other blank portion. This operation enables exposure to be performed sharply at a high resolution for forming an image, and not sharply at a low resolution for uniformizing a blank portion, by using different exposure systems, respectively.

In addition, in the above embodiment, development is performed using the reverse development method so that toner, which is charged with the same polarity as the charge polarity of the image bearing member, is adhered selectively to a portion charged with a lower electric potential. However, it can be performed also in normal development that toner, which is charged with a different polarity as the charge polarity of the image bearing member, is adhered selectively to a portion charged with a higher electric potential. This normal development can be used in both EH development and the conventional development in a similar manner.

In other words, it is possible also that forming a toner image of each color by exposing a pixel forming blank portion supposed not to be adhered with toner at the next development, so as to decrease the electric potential of the pixel in absolute value to a lower level than the electric potential of the not exposed portion forming image in the normal development method.

However, in the case of the conventional development method, similarly to the case of forming a toner image in the reverse development method, exposure for illuminating to a blank portion forming pixel that has a higher electric potential in absolute value than another blank portion forming pixel of blank portion pixels that are formed in the second or later exposure is performed at the same time as exposure for illuminating to image portion is performed, so that electric portion of the blank portion forming pixel becomes the same level as the electric potential of the other blank portion. This operation enables prevention of scumming, even in conventional development in which toner also contacts with blank portions.

Alternatively, exposure for illuminating to a blank portion forming pixel that has a higher electric potential in absolute value than another blank portion forming pixel of blank portion pixels that are formed in the second or later exposure is performed before or after exposure for illuminating to an image portion is performed using another optical system of exposure, so that an electric portion of the blank portion forming pixel becomes the same level as the electric potential of the other blank portion. This operation enables exposure to be performed sharply at a high resolution for forming an image, and not sharply at a low resolution for uniformizing a blank portion, by using different exposure systems, respectively.

While the present invention has been described with a preferred embodiment, this description is not intended to limit the scope of the invention. Various modifications of the embodiment will be apparent to those skilled in the art. Such modifications or embodiments also fall within the true scope of the present invention.

The invention claimed is:

1. An image forming apparatus for forming a color image, comprising:

a charging device configured to charge a moving image bearing member;

a writing device configured to form a latent image on the image bearing member by exposing a plurality of colors according to image information; and a developing device configured to develop the latent image with toner of each of the plurality of colors, wherein the writing device and the developing device are configured to perform exposure and development for each color of the plurality of colors after a single charge of the image bearing member by the charging device;

wherein, for each color, the developing device is configured to superimpose the toner of the color on the image bearing member after exposure for the color is performed by the writing device, so that the color image is formed from superimposed toner of each of the plurality of colors on the image bearing member;

the writing device is configured to expose an image portion forming pixel supposed to be adhered with toner at a next development so as to decrease an electric potential of the image portion forming pixel in absolute value to a lower level than an electric potential of a blank portion forming pixel that is not exposed; and the writing device is configured to expose to a blank portion forming pixel that has a higher electric potential in absolute value than another blank portion forming pixel of blank portion pixels that are formed in a second or later exposure at a same time as exposure to an image portion is performed, so that an electric portion of the blank portion forming pixel becomes a same level as an electric potential of the another blank portion.

2. The image forming apparatus of claim 1, wherein the developing device is configured to develop the latest image by making the toner hopping with a phase-shifted electric field.

3. The image forming apparatus of claim 1, wherein the charging device is a contact-type charging device.

4. The image forming apparatus of claim 3, wherein the contact-type charging device is a charge-injection-type charging device.

5. The image forming apparatus of claim 1, wherein the charging device is configured to charge so that an electric potential becomes more than a maximum electric potential of a layer of toner that is developed on the image bearing member.

6. An image forming apparatus for forming a color image, comprising:

a charging device configured to charge a moving image bearing member;

a writing device configured to form a latent image on the image bearing member by exposing a plurality of colors according to image information; and a developing device configured to develop the latent image with toner of each of the plurality of colors, wherein the writing device and the developing device are configured to perform exposure and development for each color of the plurality of colors after a single charge of the image bearing member by the charging device;

wherein, for each color, the developing device is configured to superimpose the toner of the color on the image bearing member after exposure for the color is performed by the writing device, so that the color image is formed from superimposed toner of each of the plurality of colors on the image bearing member;

the writing device is configured to expose an image portion forming pixel supposed to be adhered with toner at a next development so as to decrease an electric potential of the image portion forming pixel in absolute value to a lower level than an electric potential of a blank portion forming pixel that is not exposed; and the writing device is configured to expose to a blank portion forming pixel that has a higher electric potential in absolute value than another blank portion forming pixel of blank portion pixels that are formed in a second or later exposure before or after exposure to an image portion is performed so that an electric portion of the blank portion forming pixel becomes a same level as an electric potential of the another blank portion.

7. An image forming apparatus for forming a color image, comprising:

a charging device configured to charge a moving image bearing member;

a writing device configured to form a latent image on the image bearing member by exposing a plurality of colors according to image information; and a developing device configured to develop the latent image with toner of each of the plurality of colors, wherein the writing device and the developing device are configured to perform exposure and development for each color of the plurality of colors after a single charge of the image bearing member by the charging device;

wherein, for each color, the developing device is configured to superimpose the toner of the color on the image bearing member after exposure for the color is performed by the writing device, so that the color image is formed from superimposed toner of each of the plurality of colors on the image bearing member;

the writing device is configured to expose a blank portion forming pixel supposed not to be adhered with toner at a next development so as to decrease an electric potential of the image portion forming pixel in absolute value to a lower level than an electric potential of a blank portion forming pixel that is not exposed; and the writing device is configured to expose to an image portion forming pixel that has a higher electric potential in absolute value than another image portion forming pixel of image portion pixels that are formed in a second or later exposure at a same time as exposure to a blank portion is performed, so that electric portion of the image portion forming pixel becomes a same level as an electric potential of the another image portion.

8. An image forming apparatus for forming a color image, comprising:

a charging device configured to charge a moving image bearing member;

a writing device configured to form a latent image on the image bearing member by exposing a plurality of colors according to image information; and a developing device configured to develop the latent image with toner of each of the plurality of colors, wherein the writing device and the developing device are configured to perform exposure and development for each color of the plurality of colors after a single charge of the image bearing member by the charging device;

wherein, for each color, the developing device is configured to superimpose the toner of the color on the image bearing member after exposure for the color is performed by the writing device, so that the color image is formed from superimposed toner of each of the plurality of colors on the image bearing member;

the writing device is configured to expose an image portion forming pixel supposed not to be adhered with toner at a next development so as to decrease an electric potential of the image portion forming pixel in absolute value to a lower level than an electric potential of a blank portion forming pixel that is not exposed; and the writing device is configured to expose to an image portion forming pixel that has a higher electric potential in absolute value than another image portion forming pixel of image portion pixels that are formed in a second or later exposure before or after exposure to a blank portion is performed, so that an electric portion of the image portion forming pixel becomes a same level as an electric potential of the another image portion.

9. An image forming apparatus for forming a color image, comprising:

means for charging a moving image bearing member;

means for writing to the image bearing member to form a latent image on the image bearing member by exposing a plurality of colors according to image information; and means for developing the latent image with toner of each of the plurality of colors, wherein the means for writing and means for developing perform exposure and development for each color of the plurality of colors after a single charge of the image bearing member by the means for charging;

wherein, for each color, the means for developing superimposes the toner of the color on the image bearing member after exposure for the color is performed by the means for writing, so that the color image is formed from superimposed toner of each of the plurality of colors on the image bearing member; and wherein the means for writing is configured to expose an image portion forming pixel supposed to be adhered with toner at a next development so as to decrease an electric potential of the image portion forming pixel in absolute value to a lower level than an electric potential of a blank portion forming pixel that is not exposed, and to expose to a blank portion forming pixel that has a higher electric potential in absolute value than another blank portion forming pixel of blank portion pixels that are formed in a second or later exposure at a same time as exposure to the image portion is performed, so that an electric portion of the blank portion forming pixel becomes a same level as an electric potential of the another blank portion.

10. The image forming apparatus of claim 9, wherein the charging means is configured to charge in order that an electric potential becomes more than a maximum electric potential of a layer of toner that is developed on the image bearing member.

11. An image forming apparatus for forming a color image, comprising:

means for charging a moving image bearing member;

means for writing to the image bearing member to form a latent image on the image bearing member by exposing a plurality of colors according to image information; and means for developing the latent image with toner of each of the plurality of colors, wherein the means for writing and means for developing perform exposure and development for each color of the plurality of colors after a single charge of the image bearing member by the means for charging;

wherein, for each color, the means for developing superimposes the toner of the color on the image bearing member after exposure for the color is performed by the means for writing, so that the color image is formed from superimposed toner of each of the plurality of colors on the image bearing member; and wherein the means for writing is configured to expose a blank portion forming pixel supposed not to be adhered with toner at a next development so as to decrease an electric potential of the image portion forming pixel in absolute value to a lower level than an electric potential of a blank portion forming pixel that is not exposed, and to expose to an image portion forming pixel that has a higher electric potential in absolute value than another image portion forming pixel of image portion pixels that are formed in a second or later exposure at a same time as exposure to the blank portion is performed, so that an electric portion of the image portion forming pixel becomes a same level as an electric potential of the another image portion.

12. An image forming apparatus for forming a color image, comprising:

means for charging a moving image bearing member;

means for writing to the image bearing member to form a latent image on the image bearing member by exposing a plurality of colors according to image information; and means for developing the latent image with toner of each of the plurality of colors, wherein the means for writing and means for developing perform exposure and development for each color of the plurality of colors after a single charge of the image bearing member by the means for charging;

wherein, for each color, the means for developing superimposes the toner of the color on the image bearing member after exposure for the color is performed by the means for writing, so that the color image is formed from superimposed toner of each of the plurality of colors on the image bearing member; and wherein the means for writing is configured to expose a blank portion forming pixel supposed not to be adhered with toner at a next development so as to decrease an electric potential of the image portion forming pixel in absolute value to a lower level than an electric potential of a blank portion forming pixel that is not exposed, and to expose to an image portion forming pixel that has a higher electric potential in absolute value than another image portion forming pixel of image portion pixels that are formed in a second or later exposure before or after exposure to the blank portion is performed, so that an electric portion of the image portion forming pixel becomes a same level as an electric potential of the another image portion.

13. A method for forming a color image, comprising:

charging a moving image bearing member once;

writing to the image bearing member so as to form a latent image by exposing a color of a plurality of colors according to image information;

developing the latent image with toner of the color by superimposing the toner of the exposed color on the latent image; and repeating the writing and developing steps for each of the plurality of colors so as to form the color image from superimposed toner images of each of the plurality of colors on the image bearing member, wherein the writing step includes exposing an image portion forming pixel supposed to be adhered with toner at a next development so as to decrease an electric potential of the image portion forming pixel in absolute value to a lower level than an electric potential of a blank portion forming pixel that is not exposed, and exposing a blank portion forming pixel that has a higher electric potential in absolute value than another blank portion forming pixel of blank portion pixels that are formed in a second or later exposure at a same time as exposure to an image portion is performed, so that an electric portion of the blank portion forming pixel becomes a same level as an electric potential of the another blank portion.

14. The image forming method of claim 13, wherein a charged electric potential is more than a maximum electric potential of the layer of toner that is developed on the image bearing member.

* * * * *